(12) United States Patent
Friend

(10) Patent No.: US 9,465,113 B2
(45) Date of Patent: Oct. 11, 2016

(54) MACHINE POSITIONING SYSTEM UTILIZING RELATIVE POSE INFORMATION

(71) Applicant: CATERPILLAR INC., Peoria, IL (US)

(72) Inventor: Paul Russell Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 126 days.

(21) Appl. No.: 14/146,485

(22) Filed: Jan. 2, 2014

(65) Prior Publication Data

US 2015/0185024 A1 Jul. 2, 2015

(51) Int. Cl.
  *G01S 19/13* (2010.01)
  *G01S 19/51* (2010.01)

(52) U.S. Cl.
  CPC ............... *G01S 19/13* (2013.01); *G01S 19/51* (2013.01)

(58) Field of Classification Search
  CPC ............ G05D 1/0202; G05D 1/0212; G05D 1/0221; G05D 1/0225; G05D 2201/0216; G05D 1/0011; G05D 1/0219; G05D 1/0223; G01S 17/89; G01S 19/36; G01S 19/43; G01S 19/44; G01S 5/0063; G01S 13/931; G01S 19/52; G01S 19/55
  See application file for complete search history.

(56) References Cited

U.S. PATENT DOCUMENTS

| | | | |
|---|---|---|---|
| 5,546,093 A | 8/1996 | Gudat et al. | |
| 5,999,880 A * | 12/1999 | Okada et al. | 701/469 |
| 7,277,784 B2 | 10/2007 | Weiss | |
| 8,026,848 B2 | 9/2011 | Hanson | |
| 8,255,144 B2 | 8/2012 | Breed et al. | |
| 2001/0018636 A1* | 8/2001 | Mizuno | 701/207 |
| 2002/0083695 A1* | 7/2002 | Behnke et al. | 56/119 |
| 2007/0268155 A1* | 11/2007 | Holmes et al. | 340/901 |
| 2009/0140916 A1* | 6/2009 | Shamoto | 342/357.08 |
| 2010/0026577 A1* | 2/2010 | Hanson | 342/387 |
| 2011/0037646 A1* | 2/2011 | Tajima et al. | 342/357.26 |
| 2012/0215394 A1* | 8/2012 | Wang et al. | 701/24 |
| 2013/0231823 A1* | 9/2013 | Wang et al. | 701/24 |
| 2014/0146167 A1* | 5/2014 | Friend et al. | 348/118 |

* cited by examiner

*Primary Examiner* — Truc M Do
(74) *Attorney, Agent, or Firm* — Finnegan, Henderson, Farabow, Garrett & Dunner, LLP; L. Glenn Waterfield

(57) ABSTRACT

A system and method for estimating a position of a machine is disclosed. The method may include determining a first position estimate and a first uncertainty measure of the first machine. The method may further include receiving, from a second machine, relative pose information determined by the second machine and a second uncertainty measure of the second machine. The method may further include determining that the first uncertainty measure is higher than the second uncertainty measure. The method may further include, in response to determining that the first uncertainty measure is higher than the second uncertainty measure, determining a second position estimate of the first machine based on the first position estimate and the relative pose information.

20 Claims, 6 Drawing Sheets

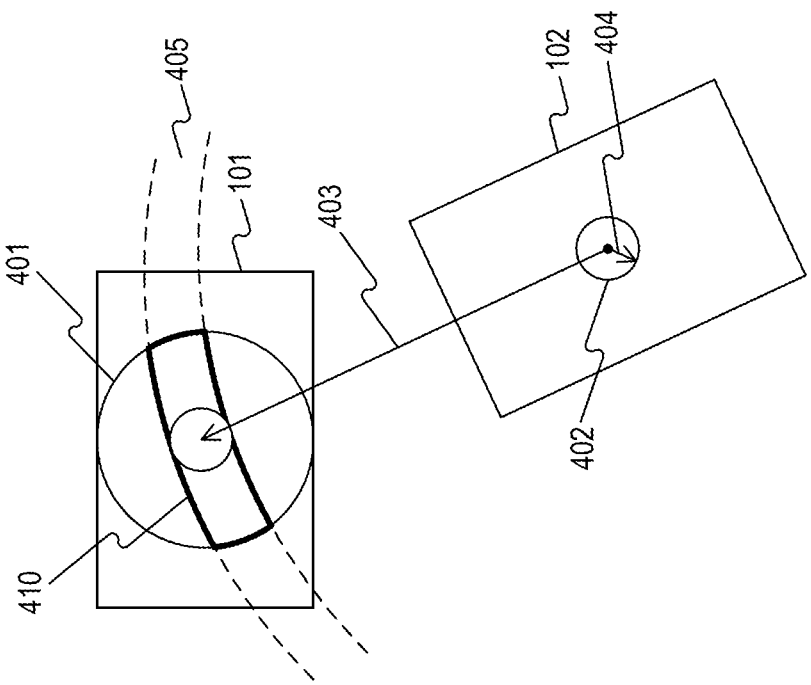
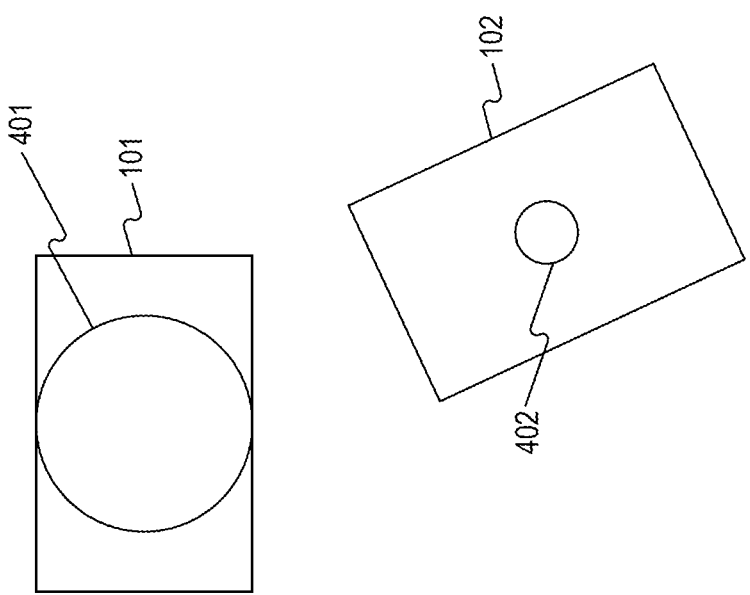
FIG. 5B
FIG. 5A

MACHINE POSITIONING SYSTEM UTILIZING RELATIVE POSE INFORMATION

TECHNICAL FIELD

The present disclosure relates generally to a machine positioning system and, more particularly, to a machine positioning system that utilizes relative pose information to determine a more accurate position for a machine.

BACKGROUND

Machines such as, for example, dozers, motor graders, wheel loaders, wheel tractor scrapers, and other types of heavy equipment are used to perform a variety of tasks. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The position of the machine is a parameter whose accuracy may be important for control of the machine and its operations.

Conventional machines typically utilize a navigation or positioning system to determine the absolute position for the machine. Some conventional machines utilize a combination of one or more of Global Navigation Satellite System (GNSS) data, a Distance Measurement Indicator (DMI) or odometer measurement data, Inertial Measurement Unit (IMU) data, etc. In addition to having mechanisms for determining absolute position, conventional machines also include mechanisms such as RADAR sensors, SONAR sensors, LIDAR sensors, IR and non-IR cameras, and other similar sensors to determine relative pose between two or more machines. Pose, as used in this disclosure, refers to both position and orientation. However, conventional machines do not utilize this relative pose information to refine their absolute position and derive a more robust and accurate measure of their absolute machines.

An exemplary system that may be utilized to determine the relative position of a first machine with respect to a second machine is disclosed in U.S. Pat. No. 8,026,848 ("the '848 patent") to Hanson. The system of the '848 patent determines the relative position by utilizing radios. Specifically, the '848 patent utilizes the time of flight of a radio signal to determine the relative position. Although the system of the '848 patent may be useful in determining the relative positions of two machines, the system does not go further and utilize this information to determine or further refine an absolute position measurement for the machines.

The positioning system of the present disclosure is directed toward solving one or more of the problems set forth above and/or other problems of the prior art.

SUMMARY

In one aspect, the present disclosure is directed to a system for estimating a position of a first machine. The system may include a locating device, at the first machine, configured to receive a first signal indicative of a location of the first machine. The system may further include a controller, at the first machine, in communication with the locating device. The controller may be configured to determine a first position estimate and a first uncertainty measure of the first machine based on the first signal. The controller may be further configured to receive, from a second machine, relative pose information determined by the second machine and a second uncertainty measure of the second machine. The controller may be further configured to determine that the first uncertainty measure is higher than the second uncertainty measure. The controller may be further configured to, in response to determining that the first uncertainty measure is higher than the second uncertainty measure, determine a second position estimate of the first machine based on the first position estimate and the relative pose information.

In another aspect, the present disclosure is directed to a method of estimating a position of a first machine. The method may include determining a first position estimate and a first uncertainty measure of the first machine. The method may further include receiving, from a second machine, relative pose information determined by the second machine and a second uncertainty measure of the second machine. The method may further include determining that the first uncertainty measure is higher than the second uncertainty measure. The method may further include, in response to determining that the first uncertainty measure is higher than the second uncertainty measure, determining a second position estimate of the first machine based on the first position estimate and the relative pose information.

In another aspect, the present disclosure is directed to a non-transitory computer-readable storage device storing instruction for enabling a processor to execute a method of estimating position of a first machine. The method may include determining a first position estimate and a first uncertainty measure of the first machine. The method may further include receiving, from a second machine, relative pose information determined by the second machine and a second uncertainty measure of the second machine. The method may further include determining that the first uncertainty measure is higher than the second uncertainty measure. The method may further include, in response to determining that the first uncertainty measure is higher than the second uncertainty measure, determining a second position estimate of the first machine based on the first position estimate and the relative pose information.

BRIEF DESCRIPTION OF THE DRAWINGS

FIGS. 4A, 4B, 5A, 5B, 6A, and 6B illustrate examples of machines utilizing the system of FIG. 2 and method of FIG. 3.

DETAILED DESCRIPTION

Figure 1:
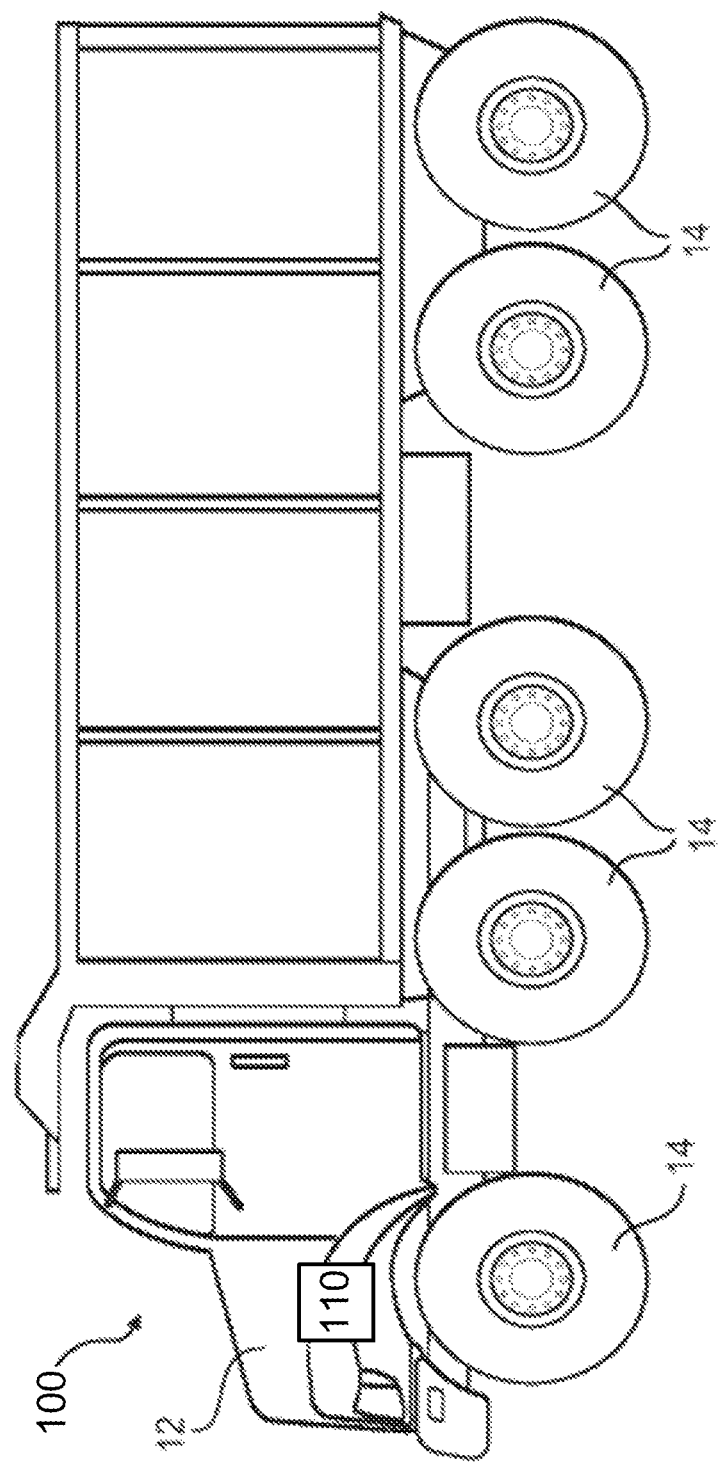
FIG. 1 is a pictorial illustration of an exemplary disclosed machine.

FIG. 1 illustrates a machine 100 having an exemplary disclosed positioning system 110. The machine 100 may be configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper or any other earth moving machine. Machine 100 may generally include a frame 12 that at least partially defines or supports an operator station, one or more engines mounted to the frame, a plurality of traction devices 14 driven by the engine to propel machine 100. The traction devices 14, in the disclosed exemplary embodiments, are wheels located at opposing sides of machine 100. Each traction device 14 may be independently driven to turn machine 100 or simultaneously and dependently driven to propel machine 100 in a straight direction. It is contemplated that one or all of traction devices 14 may be replaced with another type of traction device, if desired, such as belts or tracks.

Figure 2:
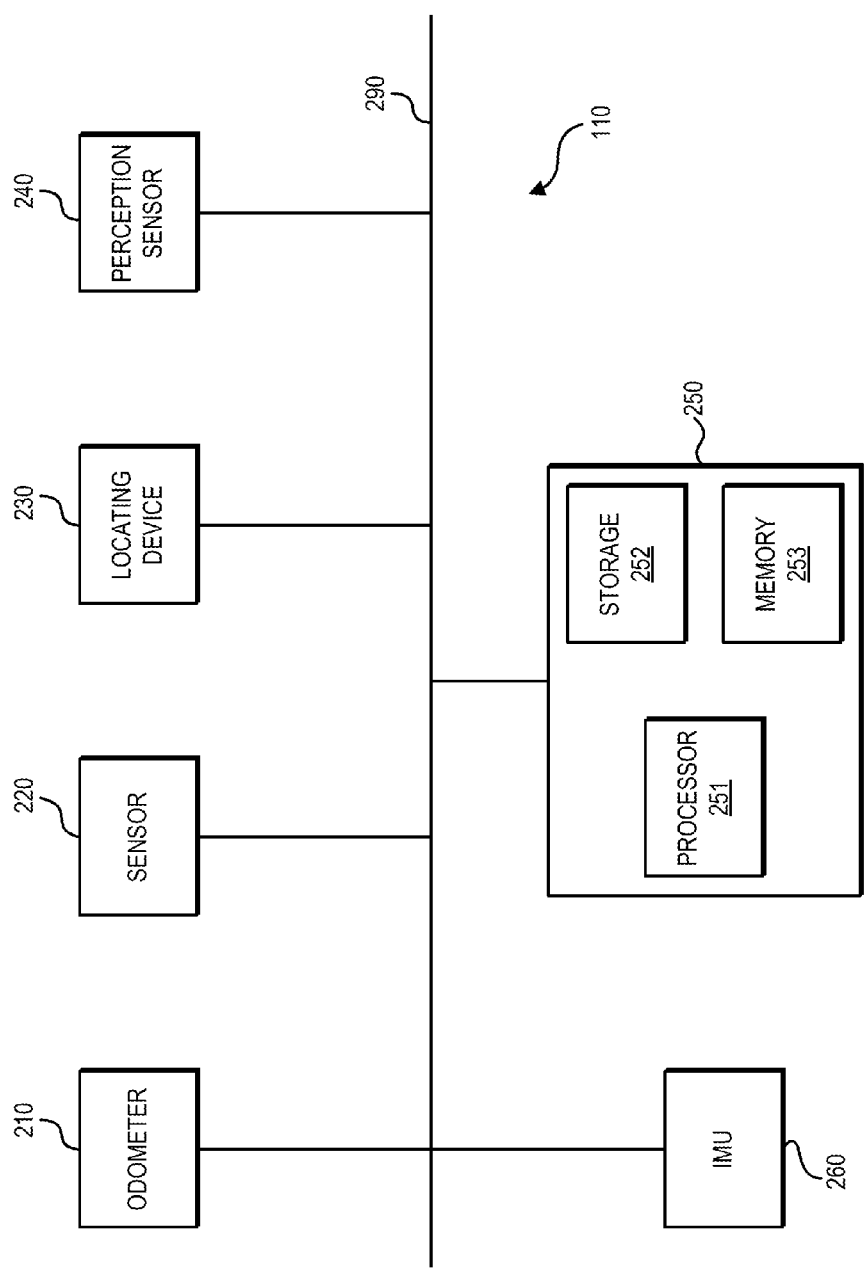
FIG. 2 is a diagrammatic illustration of an exemplary disclosed positioning system that may be used in conjunction with the machine of FIG. 1.

FIG. 2 illustrates an exemplary embodiment of the positioning system 110. The positioning system 110 may include an odometer 210, a sensor 220, a locating device 230, a range sensor 240, a controller 250, and an inertial measurement unit (IMU) 260. The above sensors and the controller 250 may be connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

The odometer 210 may provide a signal indicative of a distance traveled by the machine 100. The odometer 210 may provide as the signal, a measurement of the number of rotations of the traction device 14 (such as a wheel 14). The odometer 210 may also provide, as the signal indicative of a distance traveled by the machine, a measurement of the number of rotations of a member of the machine 100's drive train. For example, the odometer 210 may provide a measurement of the number of rotations of an axle of the machine 100.

The sensor 220 may include any device capable of providing parametric values or machine parameters associated with performance of the machine 100. For example, the sensor 220 may include a payload sensor that provides a signal indicative of a payload of the machine 100. The sensor 220 may further include a slip detector that provides a signal indicative of a slip of the machine 100. The sensor 220 may further include devices capable of providing signals indicative of a slope of the ground on which the machine 100 is operating, an outside temperature, tire pressure if the fraction device 14 is a wheel, etc. It will be understood that the sensor 220 may have one or more of the above-mentioned devices that provide the different parametric values or machine parameters such as payload, temperature, tire pressure, slip, slope, etc.

The locating device 230 may include any device capable of providing a signal that indicates the machine's location. More particularly, the locating device 230 may provide the absolute position of the machine 100 and a corresponding uncertainty measure that may be an RMS (root-mean squared) error associated with the measured absolute position. For example, the locating device 230 could embody, a global satellite system device (e.g., a GPS or GNSS device) that receives or determines positional information associated with machine 100 and can provide an independent measurement of the machine's position. The locating device 230 may be configured to convey a signal indicative of the received or determined positional information to one or more of interface devices for display of machine location, if desired. The signal may also be directed to a controller 250 for further processing. In the exemplary embodiments discussed herein, the locating device 230 receives a GPS signal as the location signal indicative of the location of the machine 100 and provides the received location signal to the controller 250 for further processing. However, it will be understood by one of ordinary skill in the art that the disclosed exemplary embodiments could be modified to utilize other indicators of the location of the machine 100, if desired.

The range sensor 240 may include any device that is capable of determining the relative pose (range and/or orientation) of the machine 100 with respect to another machine 100 or object. Exemplarily, the range sensor 240 may include ranging radios that include a transmitter and a receiver. The ranging radios may use radio frequency (RF) to determine range between machines 100 or machine 100 and another object. In an exemplary embodiment, the range sensor 240 may be a perception sensor 240, which may embody a device that detects and ranges objects located 360 degrees around the machine 100. For example, the perception sensor 240 may be embodied by a LIDAR device, a RADAR (radio detection and ranging) device, a SONAR (sound navigation and ranging) device, a camera device, or another device known in the art. In one example, the perception sensor 240 may include an emitter that emits a detection beam, and an associated receiver that receives a reflection of that detection beam. Based on characteristics of the reflected beam, a distance and a direction from an actual sensing location of the perception sensor 240 on machine 100 to a portion of a sensed physical object may be determined.

The IMU 260 may include devices that provide angular rates and acceleration of the machine 100. For example, the IMU 260 may include a 6-degree of freedom (6 DOF) IMU. A 6 DOF IMU consists of a 3-axis accelerometer, 3-axis angular rate gyros, and sometimes a 2-axis inclinometer. The 3-axis angular rate gyros may provide signals indicative of the pitch rate, yaw rate, and roll rate of the machine 100. The 3-axis accelerometer may provide signals indicative of the acceleration of the machine 100 in the x, y, and z directions.

The controller 250 may include processor 251, storage 252, and memory 253, included together in a single device and/or provided separately. Processor 251 may include one or more known processing devices, such as a microprocessor from the Pentium™ or Xeon™ family manufactured by Intel™, the Turion™ family manufactured by AMD™, or any other type of processor. Memory 253 may include one or more storage devices configured to store information used by controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one embodiment, memory 253 may include one or more position estimation programs or subprograms loaded from storage 252 or elsewhere that, when executed by processor 251, perform various procedures, operations, or processes consistent with the disclosed embodiments. For example, memory 253 may include one or more programs that enable controller 250 to, among other things, collect data from the odometer 210, the sensor 220, the locating device 230, the range sensor 240, the IMU 260, and process the data according to disclosed embodiments such as those embodiments discussed with regard to FIGS. 3, 4A, 4B, 5A, 5B, 6A, and 6B, and determine a refined absolute position of the machine 100 based on the processed data.

For example, controller 250 (and more particularly, processor 251) may execute a position estimation program in which controller 250 may determine an absolute pose (position and/or orientation) of the machine 100 based on information received from locating device 230. In an exemplary embodiment, controller 250 may determine the absolute pose of the machine 100 by using information from the odometer 210 and the sensor 220 in addition to location information received from locating device 230. The absolute pose may include the absolute position of the machine 100, which may be, for example, a 2-dimensional position specified in degrees latitude and degrees longitude. In an exemplary embodiment, the absolute position may be a 3-dimensional position specified in degrees latitude, degrees longitude, and elevation. The orientation of the machine may include one or more of the machine heading, roll, and pitch. Controller 250 may also determine along with the absolute pose, an associated uncertainty measure (for example, an error estimate such as an RMS error). This error or uncertainty measure will be hereinafter referred to as the pose error estimate. It will be apparent that a pose error estimate may include both a position error estimate and an orientation estimate. Controller 250 may exchange the absolute pose and the pose error estimate of the machine 100 with another machine 100 so that both machines 100 know each other's absolute pose and pose error estimates.

Controllers 250 of each of machines 100 may also determine the relative pose (range and/or orientation) of the machines 100. Range may indicate a distance between the machines 100. Exemplarily, the relative pose may be determined using information provided to controller 250 by the range sensor 240. Generally, the relative pose is assumed to be more accurate than the absolute pose. Accordingly, the relative pose calculated by one of the machines may be used by the other machine to refine its absolute position estimate. The above functions performed by controller 250 are explained in further detail below with reference to FIGS. 4A, 4B, 5A, 5B, 6A, and 6C.

Figure 4B:
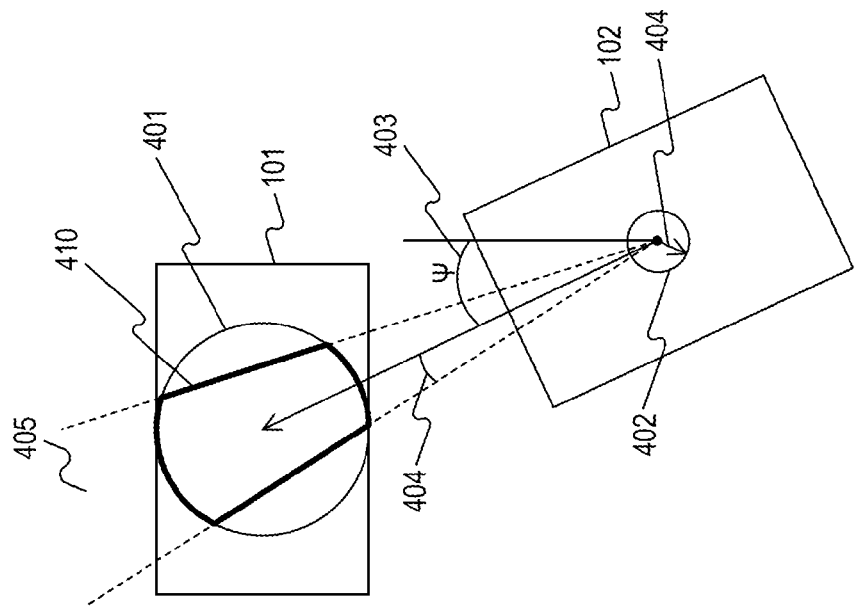
Figure 4A:
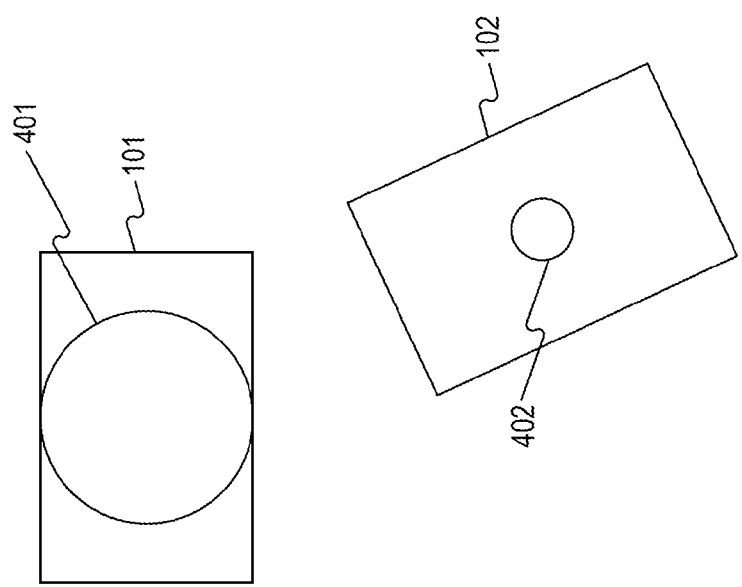

Consider two machines 100 (machines 101 and 102 in FIGS. 4A and 4B) that are communicating with each other on a worksite such as a mine site. Machine 101 may be, for example, a haul truck that has a low position certainty, i.e., a high position uncertainty. Accordingly, machine 101 may have a higher pose error estimate. Machine 102 may be, for example, a loader that has a high position certainty, i.e., a lower position uncertainty. Accordingly, machine 102 may have a lower pose error estimate. Both machines 101 and 102 may determine their absolute pose including their absolute position. The absolute position estimate of machine 101 is illustrated in FIG. 4A by area 401, where the radius of area 401 is the position error estimate. That is, machine 101 believes that its position is within area 401. The absolute position estimate of machine 102 is illustrated in FIG. 4A by area 402 whose radius 404 (see FIG. 4B) is the position error estimate of machine 102.

Machines 101 and 102 may exchange their absolute pose and pose error estimates. Machines 101 and 102 may also determine their relative poses (range and/or orientation) and communicate them with each other. In the example of FIG. 4B, the relative pose 403 includes only orientation. As shown in FIG. 4B, machine 102 may determine that machine 101 is at a heading ψ from machine 102, and machine 102 may determine its pose error estimate to be orientation error estimate 404. Based on the relative pose 403 (heading Ψ, i.e., orientation, here) and the orientation error estimate 404, machine 102 may predict that the absolute position of machine 101 is within area 405 illustrated by dotted lines in FIG. 4B. It will be understood that area 405 may be determined by machine 101 using relative pose 403, pose error estimate 404, and absolute pose of machine 102. Because the uncertainty measure associated with machine 101 is higher, machine 101 may utilize the relative pose 403 (here, orientation) and pose error estimate (here, the orientation error estimate 404) to refine its absolute position estimate. As seen from FIG. 4B, machine 101 may determine its new absolute position estimate to be area 410, which is the overlapping area between the original position estimate 401 and area 405, which is the position of machine 101 indicated by the relative pose 403. While machine 101 may also transmit relative pose information to machine 102, machine 102 may not refine its absolute position estimate using the information transmitted by machine 101 because machine 102 has a higher position certainty compared to machine 101.

The example of FIGS. 5A and 5B is similar to the example of FIGS. 4A and 4B except that the relative pose information 403 includes range in place of orientation and the pose error estimate of machine 102 is the position error estimate 404. Based on the relative pose information 403 and the position error estimate 404, machine 102 may predict that machine 101 is within area 405 illustrated by dotted lines in FIG. 5B. By using the relative pose information 403 and position error estimate 404, machine 101 may determine its new absolute position estimate to be area 410, which is the area of original position estimate 401 overlapping with area 405, which is the position indicated by relative pose information 403.

Figure 6B:
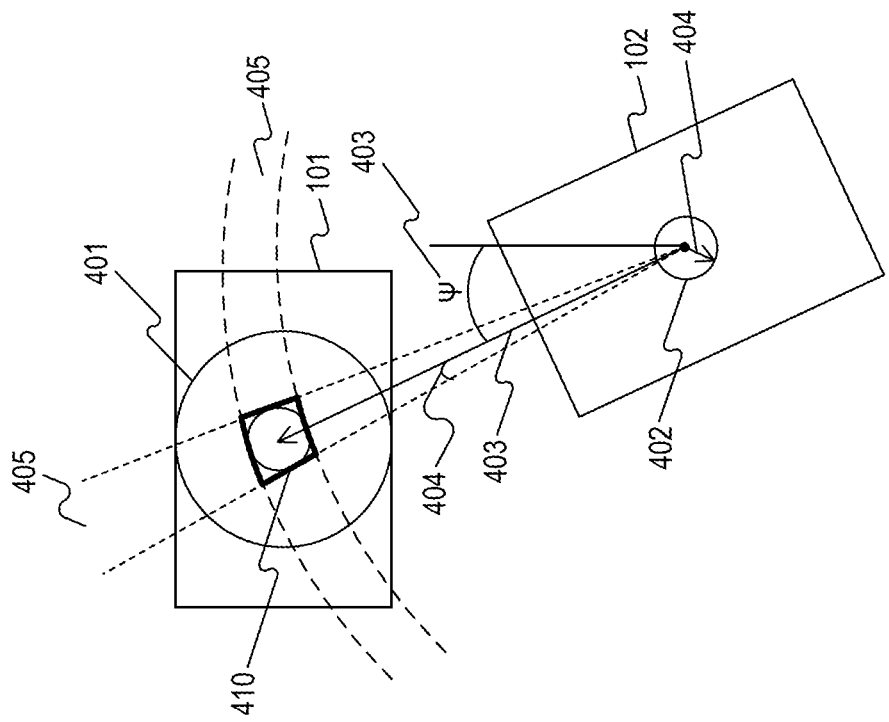
Figure 6A:
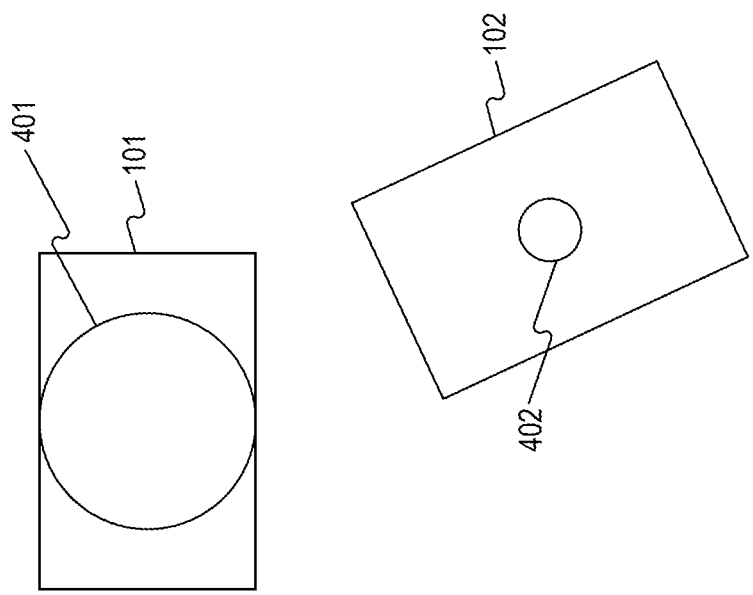

The example of FIGS. 6A and 6B is similar to the examples of FIGS. 4A-4B and 5A-5B except that the relative pose information 403 includes both range and orientation. By using the relative pose information 403 and pose error estimate 404 (here, both orientation error estimate 404 and position error estimate 404) of machine 102, machine 101 may determine its new absolute position estimate to be area 410.

It will be evident from the above examples that the controller 250 may determine a refined absolute position estimate 410 for machine 101 as compared to the original position estimate 401 by utilizing relative pose information 403 and pose error estimate 404 received from machine 102.

Figure 3:
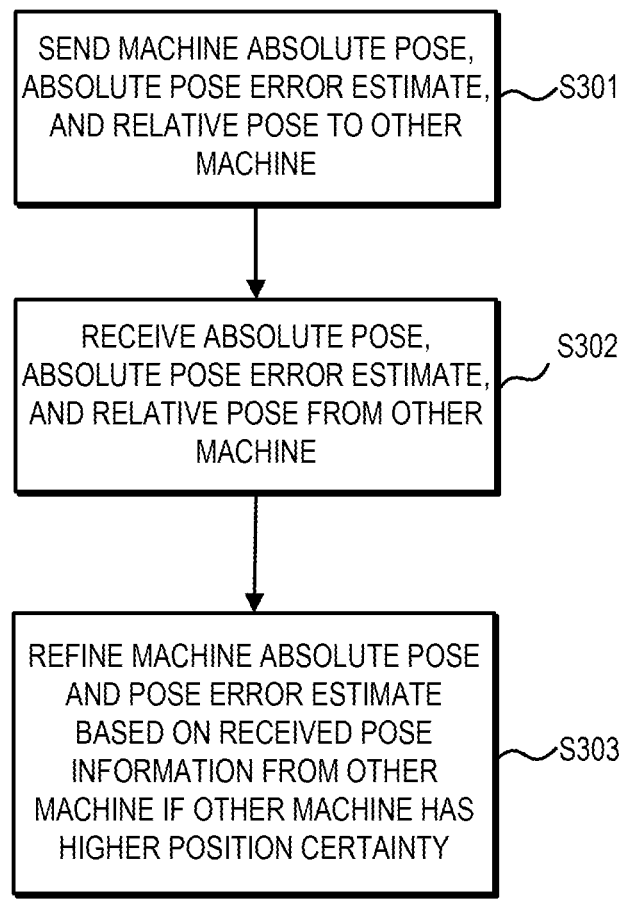
FIG. 3 is a flowchart depicting an exemplary disclosed method performed by the disclosed exemplary controller in FIG. 2.

FIG. 3 described in the next section sets forth exemplary steps performed by controller 250 to refine the absolute position of machine 100 by utilizing relative pose information from another machine.

INDUSTRIAL APPLICABILITY

The disclosed positioning system 110 may be applicable to any machine where accurate detection of the machine's position is desired. The disclosed positioning system may provide for improved estimation of the machine's position by utilizing relative pose information measured by another machine that has a higher position certainty. Operation of the positioning system 110 will now be described in connection with the flowchart of FIG. 3.

In step 301, machine 100 may send its absolute pose and pose error estimate to another machine 100. For example, controller 250 (and more particularly, processor 251) may execute a position estimation program in which controller 250 may determine an absolute pose (position and/or orientation) of the machine 100 based on information received from locating device 230. Controller 250 may also determine along with the absolute pose, an associated uncertainty measure (for example, an error estimate such as an RMS error). Controller 250 may also determine the relative pose (range and/or orientation) of machine 100. Exemplarily, the relative pose may be determined using information provided to controller 250 by the range sensor 240. Controller 250 may then send the determined absolute pose, pose error estimate, and relative pose to the other machine 100. In step 302, machine 100 may receive the absolute pose, pose error estimate, and relative pose determined by the other machine 100.

In step 303, machine 100 may refine its absolute position estimate based on the received relative pose information from the other machine 100 if the other machine 100 has a lower pose error estimate. If the other machine 100 has a higher pose error estimate, machine 100 may not refine its absolute position estimate. As seen from the examples of FIGS. 4A, 4B, 5A, 5B, 6A, and 6C, machine 100 (e.g., machine 101) may refine its absolute position estimate from area 401 to area 410 using the relative pose information 403 and pose error estimate 404 from the other machine 100 (e.g., machine 102).

While the above exemplary embodiments reference only two machines 100, it will be apparent that more than two machines 100 may interact with each other to refine their absolute position estimates. Further, one or more of the machines 100 may be static or stationary when the machines 100 are communicating their pose estimates. Additionally, in an exemplary embodiment, one of the machines 100 may be replaced by a stationary object that is not a machine 100. The stationary object may have one or more components illustrated in FIG. 2 that determine and provide the relative pose information to the machine 100. For example, in FIGS. 4A-6B, machine 102 may be replaced by a stationary object. The stationary object may determine its relative pose information with respect to machine 101 and communicate the determined relative pose information to machine 101. The stationary object's absolute pose may be known to machine 101 or transmitted to machine 101 through any known means including a central station or by the stationary object itself.

In an exemplary embodiment, the controller 250 of machine 100 may flag an error if the position indicated by the relative pose information from another machine 100 falls outside the bounds of the absolute position estimate calculated by machine 100. For example, if the position (area 405) indicated by relative pose information 403 falls outside of absolute position estimate 401, the controller of machine 101 may flag an error.

The disclosed exemplary embodiments may allow for accurate estimation of the position of the machine 100. For example, by utilizing relative pose information measured by another machine that has a lower error associated with its locating devices, an accurate estimation of the position of the machine 100 may be possible.

It will be apparent to those skilled in the art that various modifications and variations can be made to the disclosed positioning system. Other embodiments will be apparent to those skilled in the art from consideration of the specification and practice of the disclosed positioning system. It is intended that the specification and examples be considered as exemplary only, with a true scope being indicated by the following claims and their equivalents.

What is claimed is:

1. A method of determining an absolute position of a first machine, the first machine including a locating device and a controller with a processor and a memory component, the method comprising:
  generating with the locating device, and receiving with the processor, a location signal indicative of a first absolute position estimate of the first machine and a first uncertainty measure, the first uncertainty corresponding to the first absolute position estimate;
  receiving with the processor, from a second machine, relative pose information determined by the second machine, a second absolute position estimate of the second machine, and a second uncertainty measure, the second uncertainty measure corresponding to the second absolute position estimate;
  determining with the processor that the first uncertainty measure is higher than the second uncertainty measure;
  determining with the processor, at least in part in response to determining that the first uncertainty measure is higher than the second uncertainty measure, the absolute position of the first machine, and a first machine absolute uncertainty measure; based, at least in part, on the first absolute position estimate, the relative pose information, the second absolute position estimate, and the second uncertainty measure; and
  storing the absolute position of the first machine in the memory component.

2. The method of claim 1, wherein the relative pose information includes range information indicative of a distance between the first machine and the second machine as determined by the second machine.

3. The method of claim 1, wherein the relative pose information includes orientation information indicative of an orientation between the first machine and the second machine as determined by the second machine.

4. The method of claim 1, wherein:
  the relative pose information includes range information and orientation information,
  the range information is indicative of a distance between the first machine and the second machine as determined by the second machine, and
  the orientation information is indicative of an orientation between the first machine and the second machine as determined by the second machine.

5. The method of claim 1, wherein the absolute position of the first machine is more accurate than the first absolute position estimate.

6. The method of claim 1, wherein the locating device comprises a global positioning system.

7. The method of claim 1, further comprising:
  determining, by the first machine, relative pose information with respect to the second machine, and
  communicating the relative pose information determined by the first machine to the second machine.

8. A system for determining an absolute position of a first machine, comprising:
  a locating device, at the first machine, configured to generate a first location signal indicative of a first absolute location estimate of the first machine, and a first uncertainty measure associated with the first absolute location estimate of the first machine; and
  a controller, at the first machine, in communication with the locating device, the controller configured to:
    determine the first absolute position estimate and the first uncertainty measure of the first machine based on the first location signal;

receive, from a second machine, relative pose information determined by the second machine, a second absolute position estimate of the second machine, and a second uncertainty measure, the second uncertainty measure corresponding to of the second absolute position estimate;

determine that the first uncertainty measure is higher than the second uncertainty measure; and at least in part in response to determining that the first uncertainty measure is higher than the second uncertainty measure, determine the absolute position of the first machine, and a first machine absolute uncertainty measure; based, at least in part, on the first absolute position estimate, the relative pose information, the second absolute position estimate, and the second uncertainty measure; and store the absolute position of the first machine in a memory component.

9. The system of claim 8, wherein the relative pose information includes range information indicative of a distance between the first machine and the second machine as determined by the second machine.

10. The system of claim 8, wherein the relative pose information includes orientation information indicative of an orientation between the first machine and the second machine as determined by the second machine.

11. The system of claim 8, wherein:
the relative pose information includes range information and orientation information, the range information is indicative of a distance between the first machine and the second machine as determined by the second machine, and
the orientation information is indicative of an orientation between the first machine and the second machine as determined by the second machine.

12. The system of claim 8, wherein the absolute position of the first machine is more accurate than the first absolute position estimate.

13. The system of claim 8, wherein the locating device comprises a global positioning system.

14. The system of claim 8, wherein the controller is further configured to:
determine relative pose information with respect to the second machine, and
communicate the determined relative pose information to the second machine.

15. A machine control program product, comprising:
a non-transitory computer-readable storage medium; and
machine controller processor readable code stored on the non-transitory computer readable storage medium, where, if executed by a machine controller-processor of a first machine, the machine controller processor readable code causes the first machine to execute a method of determining an absolute position of the first machine, the method comprising:

determining with the processor a first absolute position estimate and a first uncertainty measure of the first machine, at least in part, in response to the processor receiving a signal from a locating device of the first machine;

receiving with the processor, from a second machine, relative pose information determined by the second machine, a second absolute position estimate of the second machine, and a second uncertainty measure, the second uncertainty measure corresponding to the second absolute position estimate;

determining with the processor that the first uncertainty measure is higher than the second uncertainty measure; and determining with the processor, at least in part in response to determining that the first uncertainty measure is higher than the second uncertainty measure, the absolute position of the first machine, and a first machine absolute uncertainty measure; based, at least in part, on the first absolute position estimate, the relative pose information, the second absolute position estimate, and the second uncertainty measure; and storing the absolute position of the first machine in a memory component.

16. The machine control program product of claim 15, wherein the relative pose information includes range information indicative of a distance between the first machine and the second machine as determined by the second machine.

17. The machine control program product of claim 15, wherein the relative pose information includes orientation information indicative of an orientation between the first machine and the second machine as determined by the second machine.

18. The machine control program product of claim 15, wherein:
the relative pose information includes range information and orientation information,
the range information is indicative of a distance between the first machine and the second machine as determined by the second machine, and
the orientation information is indicative of an orientation between the first machine and the second machine as determined by the second machine.

19. The machine control program product of claim 15, wherein the absolute position of the first machine is more accurate than the first absolute position estimate.

20. The machine control program product of claim 15, wherein the locating device comprises a global positioning system.

* * * * *

UNITED STATES PATENT AND TRADEMARK OFFICE
CERTIFICATE OF CORRECTION

PATENT NO.         : 9,465,113 B2
APPLICATION NO.    : 14/146485
DATED              : October 11, 2016
INVENTOR(S)        : Friend Page 1 of 1

It is certified that error appears in the above-identified patent and that said Letters Patent is hereby corrected as shown below:

In the Claims

Column 9, Line 5, Claim 8, delete "to of the second" and insert -- to the second --.

Signed and Sealed this
Thirty-first Day of January, 2017

Michelle K. Lee
*Director of the United States Patent and Trademark Office*